(12) United States Patent
Kannari

(10) Patent No.: US 11,117,402 B2
(45) Date of Patent: Sep. 14, 2021

(54) CUTTING OPERATION OF IMAGE FORMING APPARATUS AND NON-TRANSITORY COMPUTER READABLE MEDIUM STORING PROGRAM

(71) Applicant: FUJIFILM Business Innovation Corp., Tokyo (JP)

(72) Inventor: Tomomi Kannari, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/153,832

(22) Filed: Oct. 8, 2018

(65) Prior Publication Data
US 2019/0111714 A1 Apr. 18, 2019

(30) Foreign Application Priority Data
Oct. 17, 2017 (JP) .............................. JP2017-200753

(51) Int. Cl.
*G06F 3/12* (2006.01)
*B41J 25/20* (2006.01)
*G06K 15/00* (2006.01)
*B41J 29/44* (2006.01)
*G06K 15/02* (2006.01)

(52) U.S. Cl.
CPC ............... *B41J 25/20* (2013.01); *B41J 29/44* (2013.01); *G06F 3/1208* (2013.01); *G06K 15/002* (2013.01); *G06K 15/005* (2013.01); *G06K 15/1843* (2013.01); *G06K 15/1807* (2013.01)

(58) Field of Classification Search
CPC .... G06K 15/1807; G06F 3/1208; B41J 25/20; B41J 29/44

USPC ................................................ 358/1.15, 1.18
See application file for complete search history.

(56) References Cited

U.S. PATENT DOCUMENTS

| 6,173,649 | B1 * | 1/2001 | Onishi ...................... B41J 2/01 101/483 |
| 9,335,956 | B2 | 5/2016 | Hori |
| 2002/0175958 | A1 * | 11/2002 | Natori .................... G06K 15/02 347/5 |

(Continued)

FOREIGN PATENT DOCUMENTS

| JP | H09109506 | 4/1997 |
| JP | 2000296654 | 10/2000 |

(Continued)

OTHER PUBLICATIONS

Office Action of Japan Counterpart Application, with English translation thereof, dated Jun. 29, 2021, pp. 1-8.

*Primary Examiner* — Jamares Q Washington
(74) *Attorney, Agent, or Firm* — JCIPRNET

(57) ABSTRACT

An image forming apparatus includes a reception unit that receives an instruction to place and print an image in an area of a specific shape having an aspect ratio different from an aspect ratio of a recording sheet; a print control unit performs control such that a support image is on the recording sheet, the support image supporting specification of a cut position to cut out the area of the specific shape, in which the image of which printing instruction is received by the reception unit is printed, from the recording sheet; and an output unit outputs an explanatory image that explains the cut position with respect to the support image, in a case where the reception unit receives the printing instruction.

20 Claims, 18 Drawing Sheets

SUPPORT IMAGE EXAMPLE 2 OTHER THAN CUT LINE IMAGE (A)

(B)

(56) References Cited

U.S. PATENT DOCUMENTS

2004/0170415 A1\* 9/2004 Maeda .................. G03B 17/53
396/2

FOREIGN PATENT DOCUMENTS

| | | |
|---|---|---|
| JP | 2007144703 | 6/2007 |
| JP | 2012232530 | 11/2012 |
| JP | 2013041419 | 2/2013 |

\* cited by examiner

FINISHED IMAGE EXAMPLE

FIG. 5
PRINT FORMAT OF "SQUARE PRINTING"
(WITH CUT LINE)
BORDERLESS
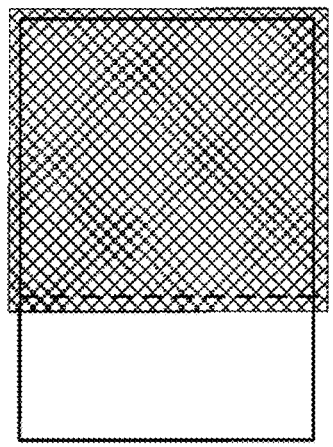
BORDERING
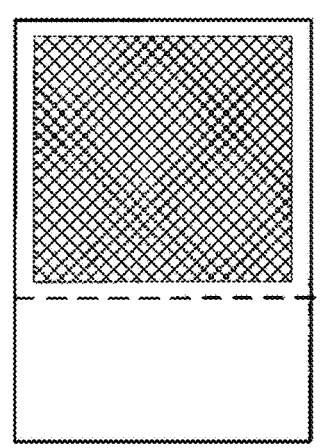
LOWER BORDER
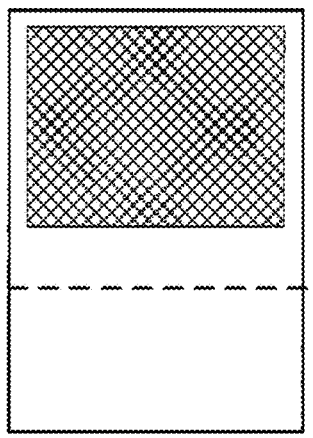
WIDE BORDER
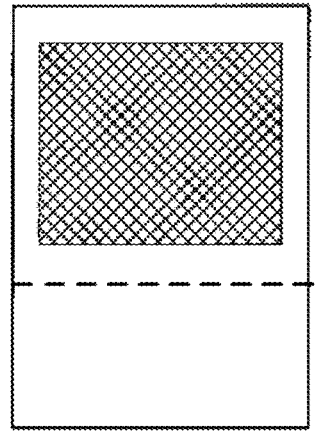
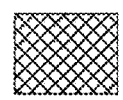 : IMAGE PRINT AREA

FIG. 10
EXPLANATORY IMAGE EXAMPLE WITHIN "CUT LINE PRINTING" BUTTON
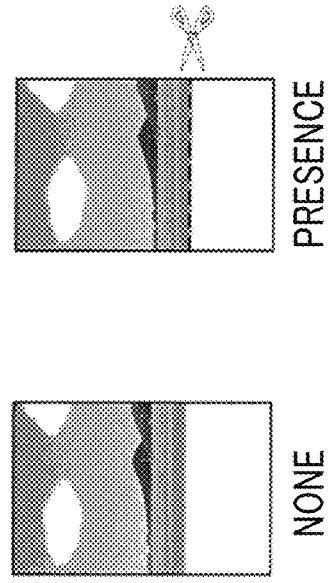
WHEN SELECTING "BORDERLESS"
NONE / PRESENCE
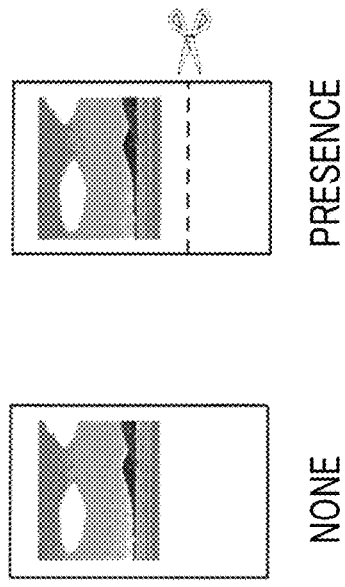
WHEN SELECTING "WIDE BORDER"
NONE / PRESENCE
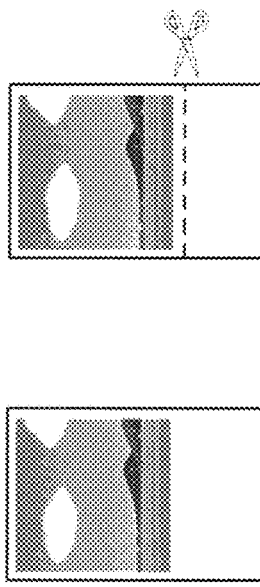
WHEN SELECTING "BORDERING"
NONE / PRESENCE
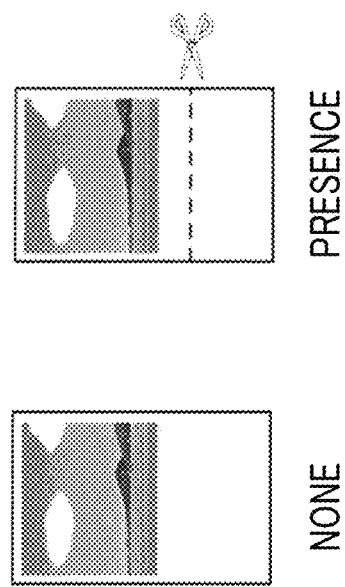
WHEN SELECTING "LOWER BORDER"
NONE / PRESENCE FIG. 11
EXPLANATORY IMAGE EXAMPLE ACCORDING TO "TYPE OF SQUARE PRINTING"
WHEN SELECTING "BORDERLESS"
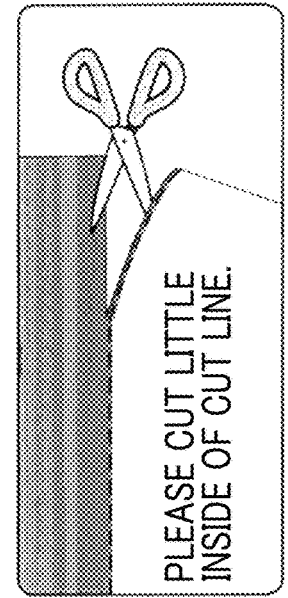
WHEN SELECTING "WIDE BORDER"
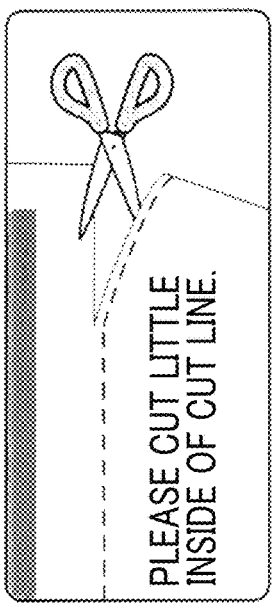
WHEN SELECTING "BORDERING"
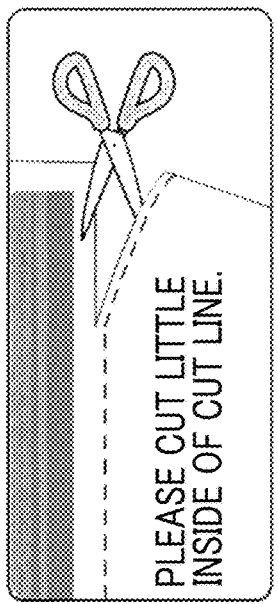
WHEN SELECTING "LOWER BORDER"

EXAMPLE IN A CASE WHERE EXPLANATORY
IMAGE IS PRINTED IN CUTTING PORTION

AT TIME OF SELECTING "BORDERING"

EXAMPLE IN A CASE WHERE EXPLANATORY
IMAGE IS PRINTED IN CUTTING PORTION

AT TIME OF SELECTING "BORDERLESS"

EXAMPLE IN A CASE WHERE WHITE CUT LINE IS
USED AS CUT LINE IMAGE

AT TIME OF SELECTING "BORDERLESS"

FIG. 17
SUPPORT IMAGE EXAMPLE 1 OTHER THAN CUT LINE IMAGE
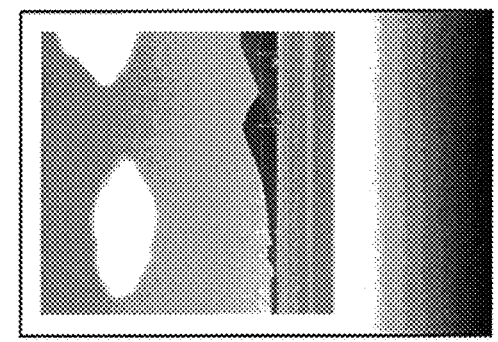
(D)
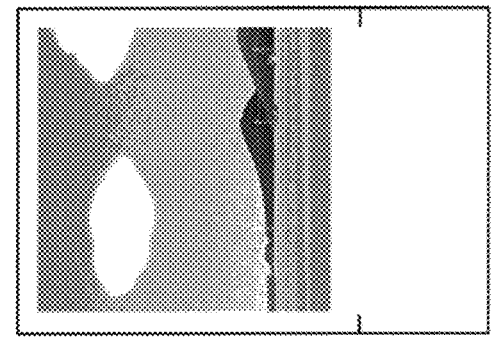
(C)
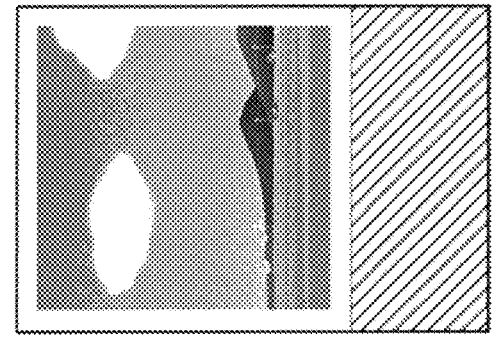
(B)
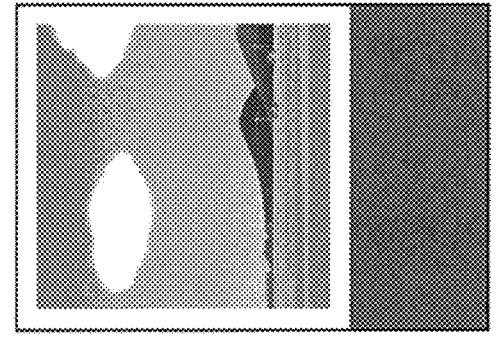
(A)

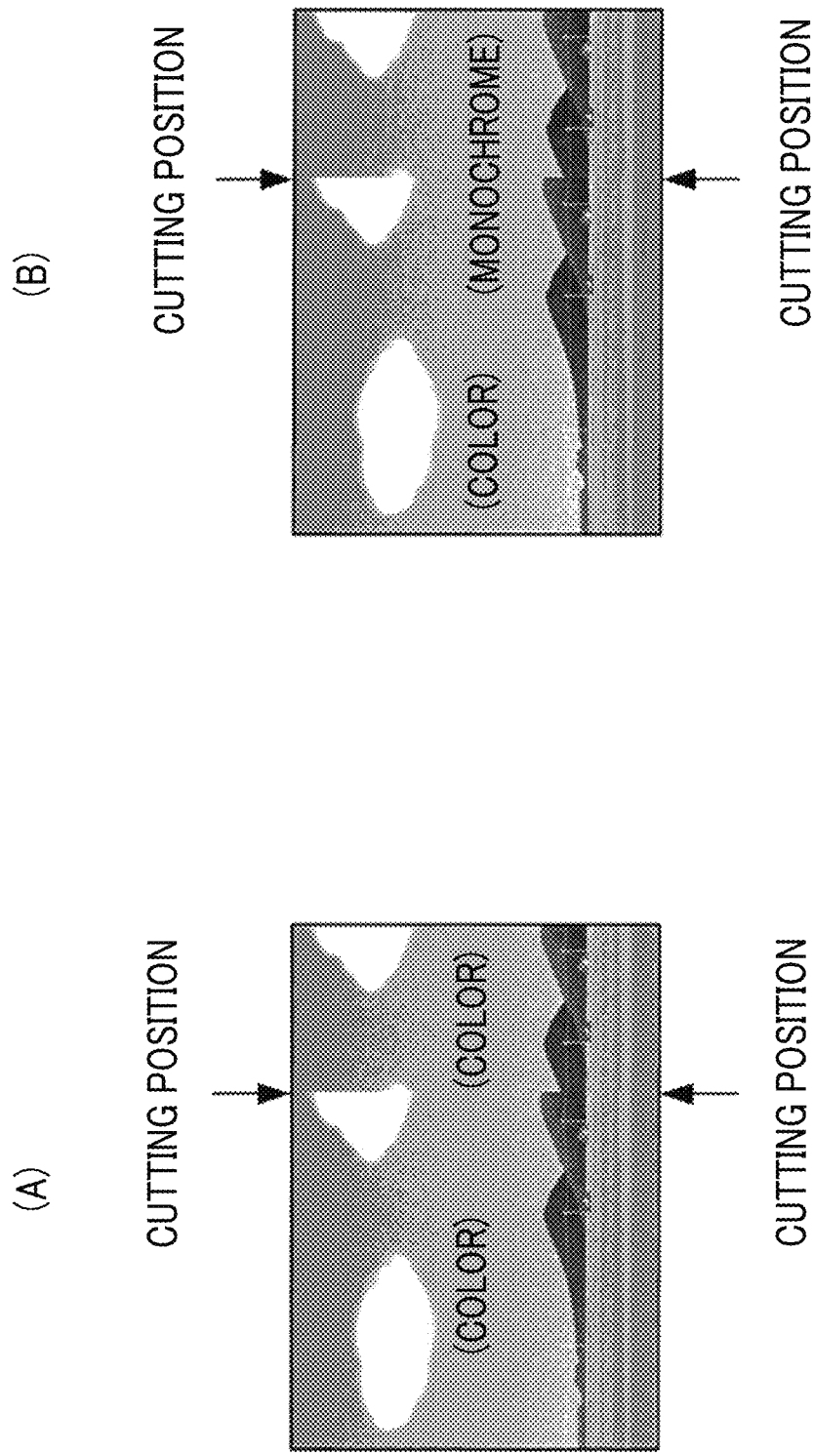

CUTTING OPERATION OF IMAGE FORMING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-200753 filed Oct. 17, 2017.

BACKGROUND

(i) Technical Field

The present invention relates to an image forming apparatus and a non-transitory computer readable medium storing a program.

(ii) Related Art

JP1997-109506A discloses an image forming method for forming a cut line, with the same color material as a color material with which an image is formed, on an image receiving sheet having the image formed on a substrate or a receiving layer provided on the substrate.

JP2012-232530A discloses a printing apparatus in which a non-transfer area of an overcoat agent is provided as a cut reference line, in a case where the overcoat agent is transferred onto a printed photo image.

SUMMARY

Along with popularization of a social networking service (SNS) in recent years, substantially square-sized photo images are widely used besides photos of prescribed sizes such as L size. Therefore, a desire to easily print such a square-sized photo image is increasing.

However, since the existing photo print recording sheet is not square, in a case where a square photo image is printed on such a photo print recording sheet, it is necessary for the user to perform a cutting operation to cut the recording sheet having the photo image printed thereon into a square shape, by using a cutter or the like.

In a case where the number of times of performing such a cutting operation increases, the work is troublesome for the user, which becomes a great labor in a case where a large number of photo images are printed.

In addition, in a case where cut lines are superimposed and printed on a photo print recording sheet in order to improve the workability of the user's cutting operation, there is a possibility that an unnecessary image such as a cut line is included in the cut-out square photo image.

Aspects of non-limiting embodiments of the present disclosure relate to an image forming apparatus and a non-transitory computer readable medium storing a program, capable of obtaining a print image of a specific shape, without including an unnecessary image, only by a necessary minimum cutting operation, even in a case where there is no recording sheet whose aspect ratio matches the area of a specific shape for placing and printing an image.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an image forming apparatus including a reception unit that receives an instruction to place and print an image in an area of a specific shape having an aspect ratio different from an aspect ratio of a recording sheet; a print control unit that performs control such that a support image is on the recording sheet, the support image supporting specification of a cut position to cut out the area of the specific shape, in which the image of which printing instruction is received by the reception unit is printed, from the recording sheet; and an output unit that outputs an explanatory image that explains the cut position with respect to the support image, in a case where the reception unit receives the printing instruction.

BRIEF DESCRIPTION OF THE DRAWINGS

Exemplary embodiment(s) of the present invention will be described in detail based on the following figures, wherein:

FIG. 5 is a diagram for describing an example of a print format in a case of performing the square printing as illustrated in FIG. 4;

FIG. 10 is a diagram illustrating an example of an explanatory image displayed within a "cut line printing" button;

FIG. 11 is a diagram illustrating an example of an explanatory image according to "type of square printing";

FIG. 17 is a diagram illustrating support image example 1 other than a cut-line image; and FIG. 18 is a diagram illustrating support image example 2 other than a cut-line image.

DETAILED DESCRIPTION

Next, exemplary embodiments of the present invention will be described in detail with reference to the drawings.

Figure 1:
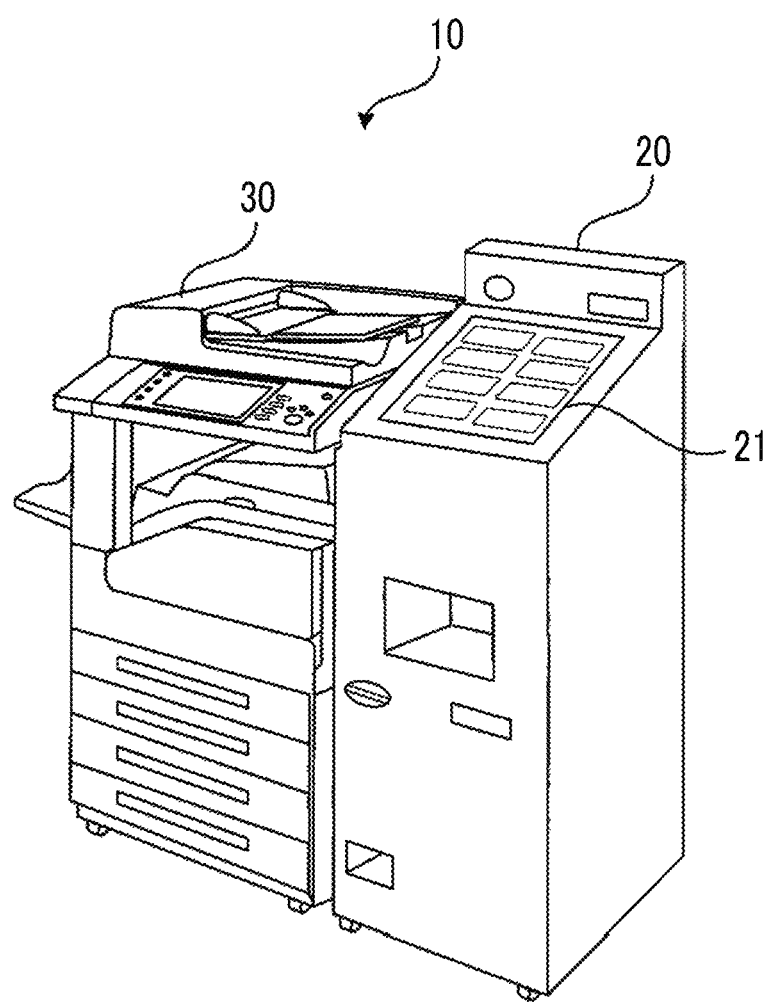
FIG. 1 is a diagram illustrating a configuration of an image forming system 10 according to an exemplary embodiment of the present invention.

FIG. 1 is a diagram illustrating a configuration of an image forming system 10 according to an exemplary embodiment of the present invention.

The image forming system 10 according to an exemplary embodiment of the present invention is provided in, for example, a convenience store, and has a configuration such that a user is able to use a variety of services such as copying, facsimile, and photo printing by inputting a fee by him/herself.

As illustrated in FIG. 1, the image forming system 10 includes an image forming apparatus 20 and an image forming apparatus 30.

The image forming apparatus 30 is a so-called multifunction peripheral having plural functions such as a print function using plain paper, a scan function, a copy function, a facsimile function, and the like. Further, the image forming apparatus 20 includes a touch panel 21, and has functions such as a photo printing function using a recording sheet for photo printing (hereinafter abbreviated as a recording sheet), a user interface function using the touch panel 21, and a fee settlement function. In addition, the entire image forming system 10 may be referred to as the image forming apparatus.

In the following description, a case of printing a square image on a recording sheet of L size (127 mm×89 mm) using the image forming system 10 of the present exemplary embodiment will be described. Therefore, in the following description, the function and configuration of the image forming apparatus 20 will be described and the description of the image forming apparatus 30 will be omitted.

Figure 2:
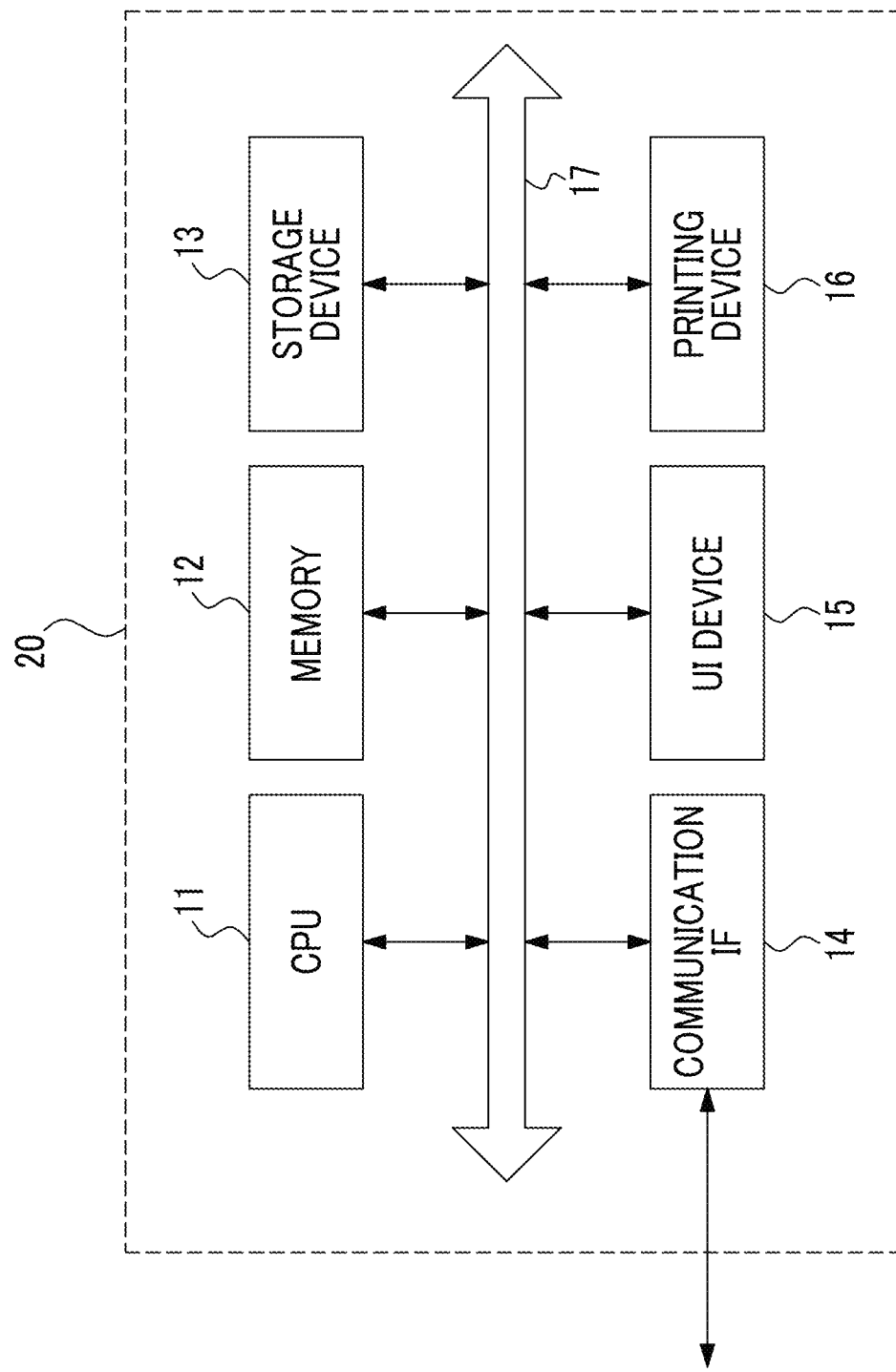
FIG. 2 is a block diagram illustrating a hardware configuration of an image forming apparatus 20 according to the exemplary embodiment of the present invention.

First, the hardware configuration of the image forming apparatus 20 in the image forming system 10 of the present exemplary embodiment is illustrated in FIG. 2.

As illustrated in FIG. 2, the image forming apparatus 20 includes a CPU 11, a memory 12, a storage device 13 such as a hard disk drive (HDD), a communication interface (IF) 14 that transmits and receives data to and from the image forming apparatus 30, an external device or the like through the communication network, a user interface (UI) device 15 such as a touch panel 21, and a printing device 16. These components are connected to each other through a control bus 17.

The CPU 11 executes a predetermined process based on a control program stored in the memory 12 or the storage device 13 to control the operation of the image forming apparatus 20. In the present exemplary embodiment, it is described that the CPU 11 reads and executes the control program stored in the memory 12 or the storage device 13, but the program may also be stored in a storage medium such as a USB memory and a CD-ROM and provided to the CPU 11.

Figure 3:
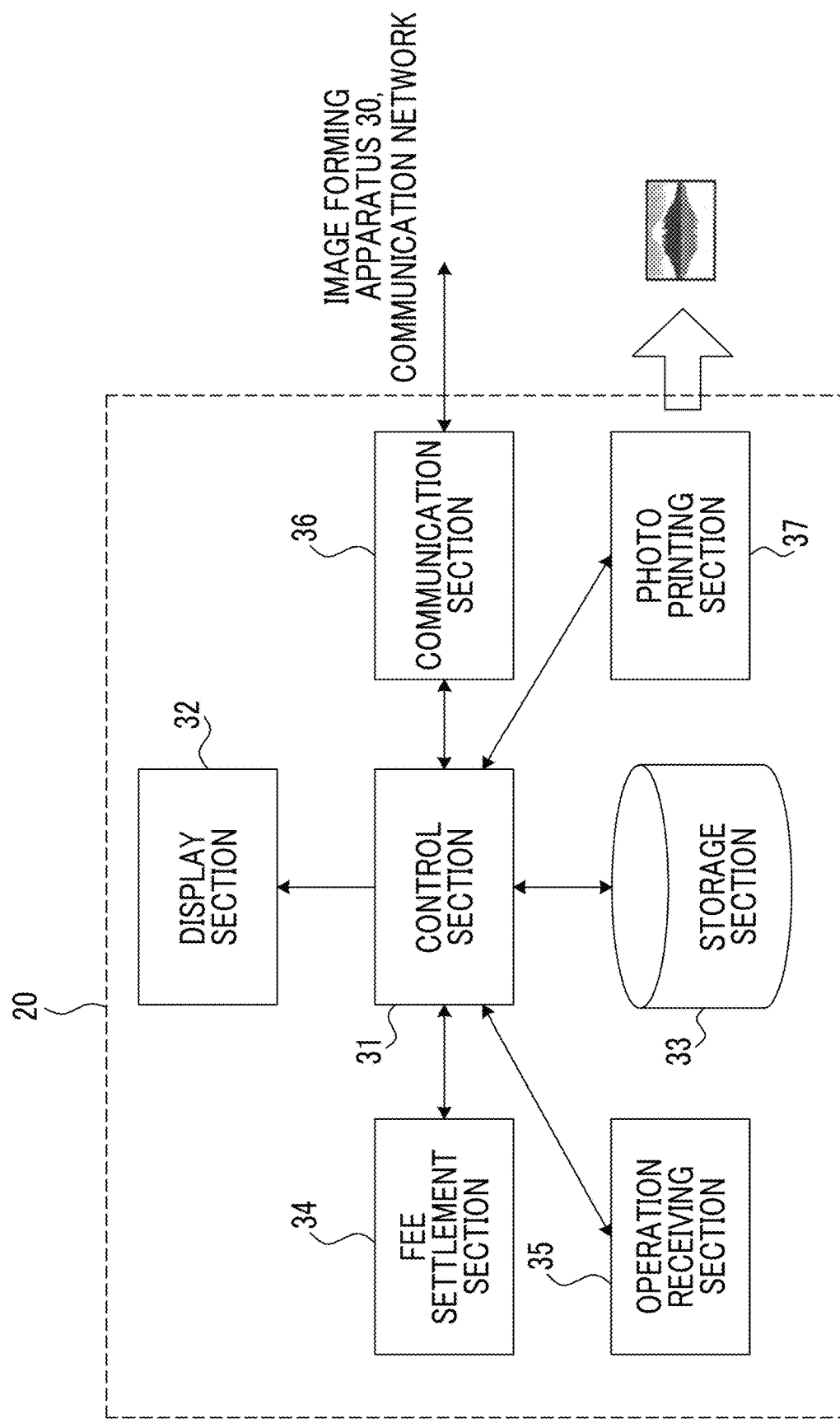
FIG. 3 is a block diagram illustrating a functional configuration of the image forming apparatus 20 according to the exemplary embodiment of the present invention.

FIG. 3 is a block diagram illustrating a functional configuration of the image forming apparatus 20 realized by executing the control program.

As illustrated in FIG. 3, the image forming apparatus 20 of the present exemplary embodiment includes a control section 31, a display section 32, a storage section 33, a fee settlement section 34, an operation receiving section 35, a communication section 36, and a photo printing section 37.

The storage section 33 is a memory for temporarily storing image data and the like while the process is performed by the control section 31.

The fee settlement section 34 performs a function of settling the fee of the service provided to the user.

The display section 32 is controlled by the control section 31 and displays various types of information to the user. The operation receiving section 35 receives various operations on the image forming system 10, from the user. In the present exemplary embodiment, the touch panel 21 includes the display section 32 and the operation receiving section 35 described above.

The communication section 36 transmits and receives data to and from an external apparatus through the image forming apparatus 30, a communication network, or the like.

Based on various operation instructions received by the operation receiving section 35, the control section 31 issues an instruction for printing to the photo printing section 37 and an execution instruction to the image forming apparatus 30.

Based on the control by the control section 31, the photo printing section 37 executes a process of printing the instructed image on the recording sheet.

Then, in a case where the user intends to execute square printing in which an image is placed and printed in a square area having an aspect ratio different from the aspect ratio of a recording sheet of L size, the operation receiving section 35 receives an instruction to place and print an image, which is input by the user. In addition, the aspect ratio of the recording sheet of L size is about 1.43, and the aspect ratio of square is 1.

Then, the control section 31 performs control such that a support image is printed outside the square area of the recording sheet, where the support image supports the specification of a cut position to cut out a square area on which an image for which an instruction for printing has been received by the operation receiving section 35 is printed, from the recording sheet, that is, the support image is an aid (guide) in a case where the user determines a cut position.

At that time, in a case where the operation receiving section 35 receives an instruction for printing, in a case where the user cuts out a square area using the support image, the control section 31 performs control so as to output an explanatory image that explains the cut position with respect to the support image.

Specifically, in a case where the operation receiving section 35 receives an instruction to place and print an image on a recording sheet by placing the image in a square area, the control section 31 outputs the explanatory image by displaying the explanatory image on the display section 32.

In addition, the control section 31 displays a cutting method for instructing to cut out the side close to the square area at the position where the support image is printed, as an explanatory image.

Further, the control section 31 may output the explanatory image by performing a process of printing the explanatory image in an area other than the square area on the recording sheet.

In the present exemplary embodiment, the case where the above support image is a cut-line image will be described.

In the case where a cut line is provided, the user empirically knows to try to cut it along the cut line with scissors, or the like (aiming at the cut line or the cutting tip). In other words, it is said that the cut line functions as a guide in a case where the user determines the position to cut out it. In the description of the present exemplary embodiment, the user tries to cut out the cut line so as not to be included in an area of a specific shape such as a square as an unnecessary image. In a case where the cut line is thin, the user sets the cutting position by visual observation aiming at the end limit of the cut line and tries to put in scissors. Therefore, cut lines are likely to be mixed into a specific shape. It has been empirically confirmed that in a case where the width of the cut line is increased, it is easier for the user to visually set the position avoiding the cut line as the cut position. It is also empirically confirmed that the setting of the cut position by the user's visual observation is performed within an area having a width approximately equal to the width of the cut line.

"A little inside" to be described in the following exemplary embodiment is an explanation meaning an area inside the support image within a range of the same length as the width of the support image in the sub-scanning direction (line width in the case of a cut line), with respect to the support image such as a cut line used as a guide for the user to determine a cut position.

That is, the cut position is between the square area on the recording sheet and the support image, and the support image is provided at a position separated from the cut position by substantially the same length as the width of the support image.

Further, in a case where edgeless printing is designated, the control section 31 performs control such that the cut-line image is printed across a square image.

In addition, the control section 31 may form the cut-line image with a white line by preventing a color material from being output in image data of an image to be placed and printed in a square area (hereinafter, sometimes, simply referred to as a square image).

Further, the support image is not limited to a cut-line image, and any image may be used as long as it supports (aids) the user to determine a cut position. For example, the control section 31 may form the support image using the image data of the image to be placed and printed in a square area. In this case, the control section 31 may form the support image using the image data of the image obtained by converting the image to be placed and printed in a square area into a monochrome image. Since the contrast difference becomes larger than the square image by using the image data of the image converted into the monochrome image, the user is able to easily recognize that it is a support image.

Further, the control section 31 may form the support image with two images printed near the long-side end portion of the recording sheet, for example, two short lines (see (C) of FIG. 17 to be described later).

In addition, the control section 31 may form the support image with images of the same color. By setting the same color in this case as the color to be less likely to be included in the square image, for example, as a result, the support image is printed in a conspicuous manner as compared to the square image and the user is able to easily recognize it.

In a case where the square image is printed on the recording sheet of L size, the control section 31 performs the printing layout such that the three sides of the end portions of the square match the end portions of the recording sheet. That is, in this case, an image is printed in a square area of which one side is a short side of the recording sheet.

Next, the operation of the image forming apparatus 20 in the present exemplary embodiment will be described in detail with reference to the drawings.

Figure 4:
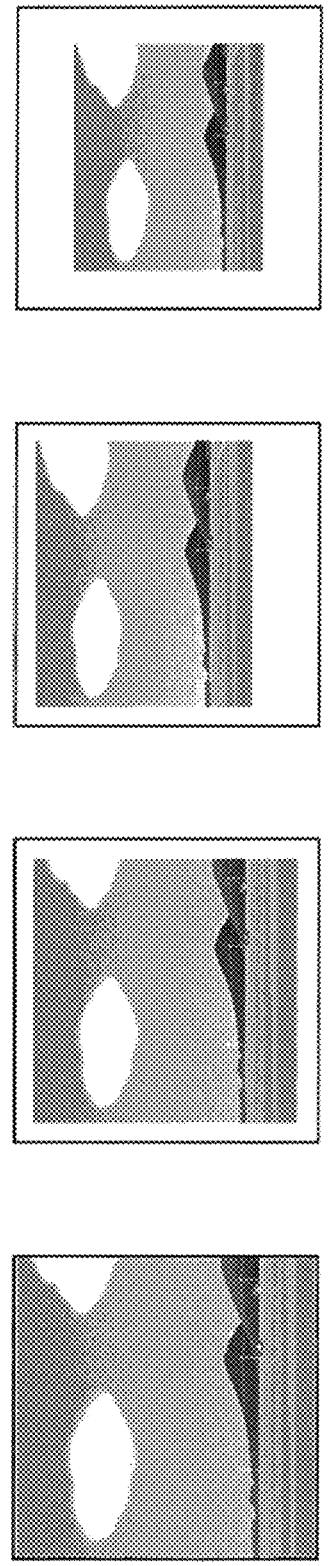
FIG. 4 is a diagram for describing types of finished image examples of images printed in square printing.

Before that, the type of a finished image printed by square printing using the image forming apparatus 20 of the present exemplary embodiment will be described with reference to FIG. 4. In the square printing according to the present exemplary embodiment, unnecessary portions of the recording sheet of L size are cut by scissors or the like, whereby four types of square printing such as borderless (edgeless) printing, bordering (with edge) printing, lower border (lower edge) printing, and wide border (wide edge) printing as illustrated in FIG. 4 may be performed.

Here, borderless printing is to print an image in a state where there is almost no white edge portion by placing the image without a margin in the entire square area. Further, bordering printing is to print an image in a state where there is white edge portion of the same width on the entire circumference of the image by placing the image a little inside of the square area from the square area.

Further, lower border printing is to print an image in a state where there is a white edge portion on the entire circumference of the image, similar to bordering printing, but is to print an image of which the lower edge portion is wider than the upper edge portion and the left and right edge portion.

In addition, the wide border printing is to print an image in a state where there is a white edge portion of the same width on the entire circumference of the image, similar to bordering printing, but is to print an image in which the border portion is wider than in the bordering printing.

Next, an example of a print format in a case of performing square printing as illustrated in FIG. 4 will be described with reference to FIG. 5. In the present exemplary embodiment, the case where square printing performed in this way is provided as a service named "square printing" will be described.

Further, FIG. 5 illustrates print formats in a case of printing a cut-line image as an aid for the user to determine the cut position, in order to place and print an image in a square area on a recording sheet of L size.

In FIG. 5, the print format is such that the image instructed to print is placed in the area indicated by shading. Here, referring to FIG. 5, it is understood that in the borderless printing, printing is performed so as to place the image in an area slightly larger than the square area. Then, in a case where the cut-line image is printed, the cut-line image is printed across a square image (in such a manner that the cut-line image and the square image overlap each other). This is because, even in a case where the printing position is slightly shifted, by cutting out a little inside of the cut-line image, the square area after cutting is made square as precise as possible, and a white margin portion and a cut-line image are not to remain in the square area.

Next, with reference to FIGS. 6 to 13, an operation method in the case of performing the above-described square printing by operating the touch panel 21 of the image forming apparatus 20 will be described.

Figure 6:
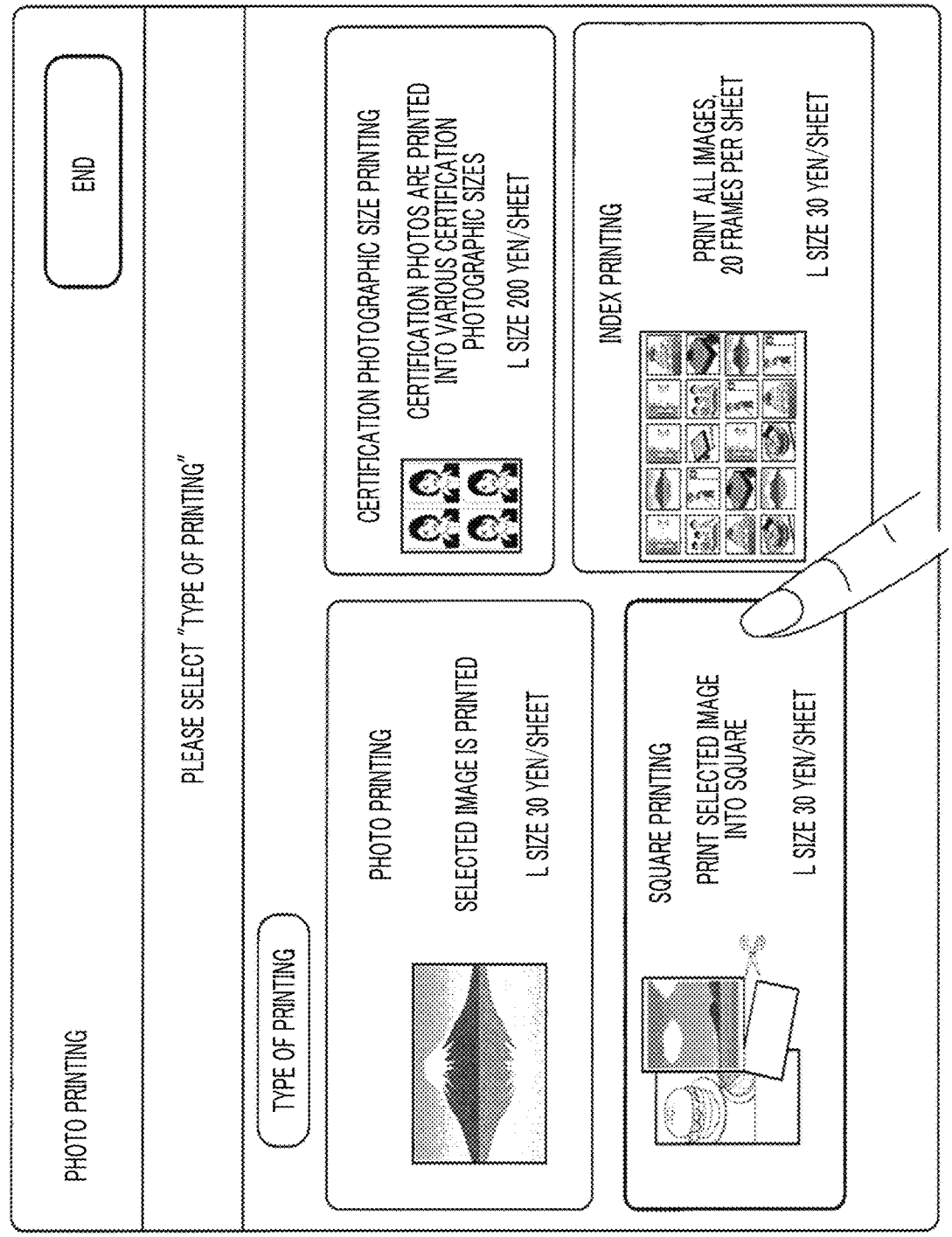
FIG. 6 is a view illustrating a display screen example in a case where a user selects a "photo printing" function.

First, FIG. 6 shows a display screen example in a case where the user selects the "photo printing" function from various service functions illustrated on the touch panel 21 of the image forming apparatus 20.

In the display screen example of "photo printing" illustrated in FIG. 6, it is possible to select "square printing" described above, in addition to general "photo printing" for printing a landscape image on a recording sheet, "certification photographic size printing" for printing a certification photo, and "index print" for collecting and printing plural images on one sheet of recording sheet.

Figure 7:
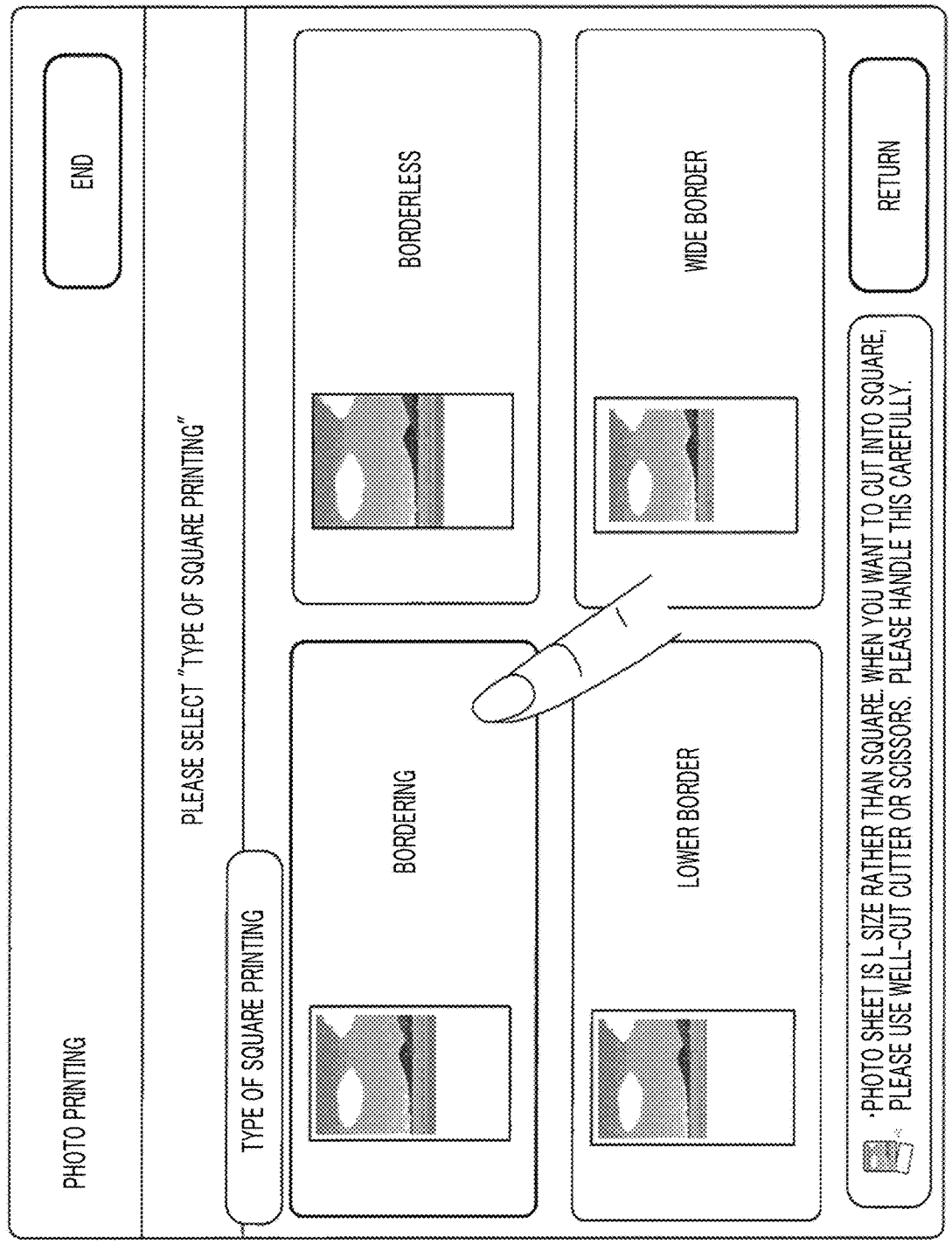
FIG. 7 is a view illustrating a display screen example displayed in a case where the user selects "square printing", in the display screen example illustrated in FIG. 6.

FIG. 7 illustrates a display screen example displayed in a case where the user selects "square printing" on the display screen example as illustrated in FIG. 6.

In the display screen example illustrated in FIG. 7, it is a screen for selecting one of "bordering", "borderless", "lower border", and "wide border", as the type of "square printing".

Figure 8:
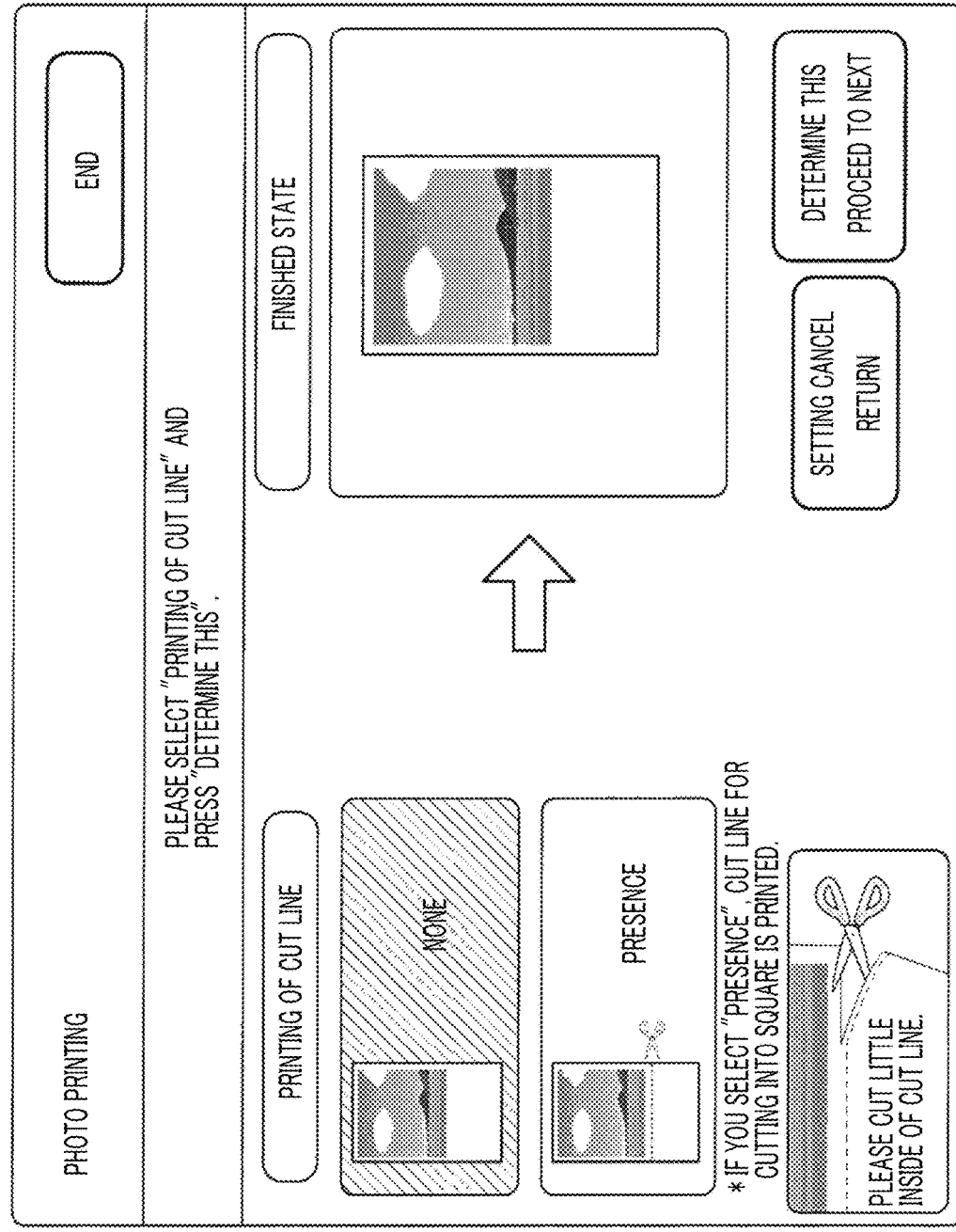
FIG. 8 is a view illustrating a display screen example displayed in a case where the user selects "bordering", in the display screen example illustrated in FIG. 7.

Next, FIG. 8 shows a display screen example displayed in a case where the user selects "bordering", in the display screen example illustrated in FIG. 7.

FIG. 8 shows a screen for allowing the user to select whether or not cut-line printing is necessary, and shows a state in which "none" indicating that cut-line printing is unnecessary is selected.

Then, in FIG. 8, since "none" meaning that cut-line printing is unnecessary is selected, the print image displayed in the "finished state" is displayed in a state where there is no cut-line image.

Figure 9:
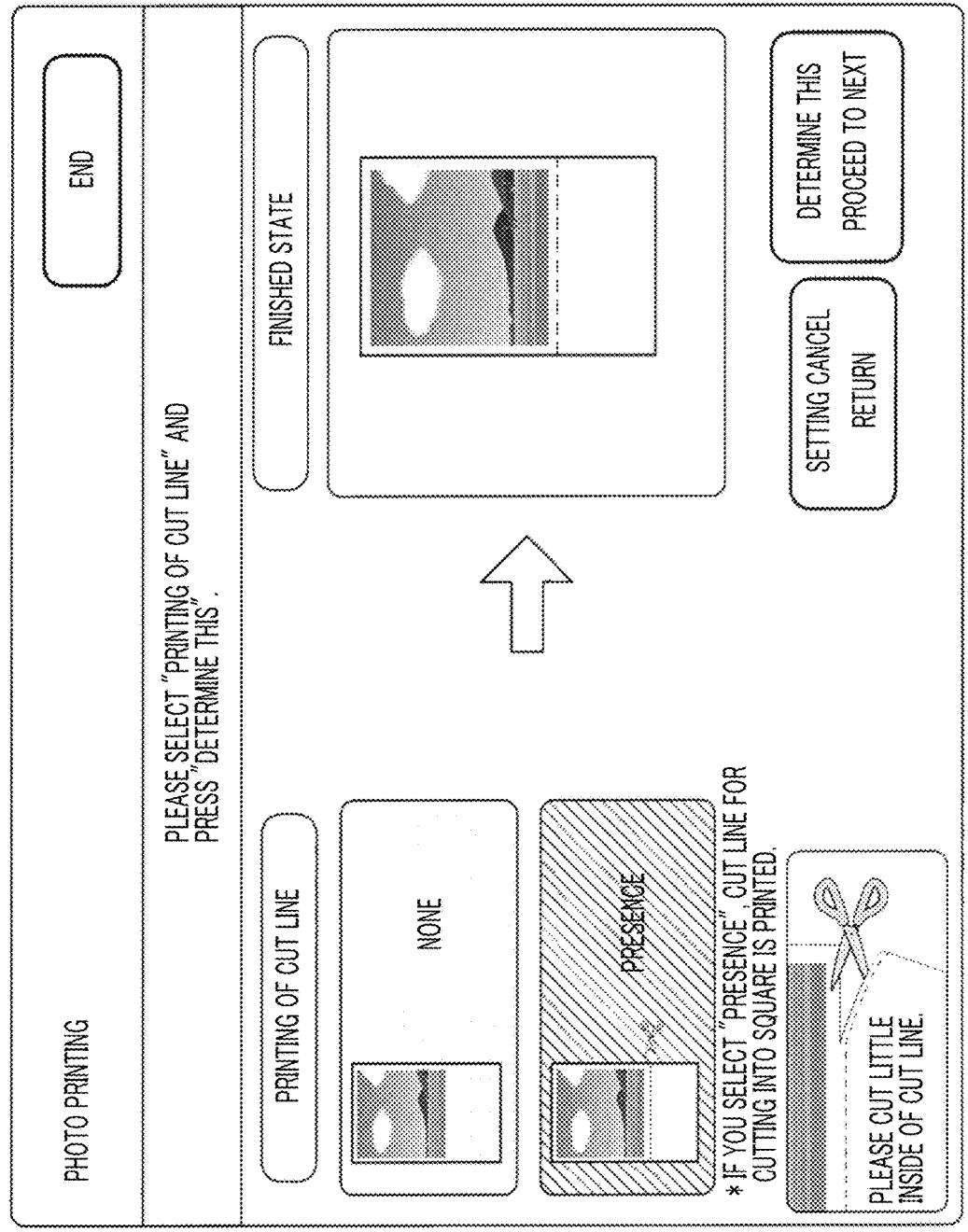
FIG. 9 is a view illustrating a display screen example in a case where the user selects "presence" meaning that printing of a cut line is necessary.

FIG. 9 illustrates a display screen example in a case where the user selects "presence" meaning that printing of a cut line is necessary.

In FIG. 9, since "presence" meaning that cut-line printing is necessary is selected, the print image displayed in the "finished state" is displayed in a state where there is a cut-line image.

The explanatory image displayed in the button for selecting whether or not cut-line printing is necessary is designed to change every type of "square printing" such as "bordering", "borderless", "lower border", and "wide border".

Specifically, as illustrated in FIG. 10, for each type of "bordering", "borderless", "lower border", and "wide border", an explanatory image corresponding to each state is displayed in the "none" and "presence" buttons.

In the display screen examples illustrated in FIGS. 8 and 9, a case where an explanatory image that explains the cut position in a case of cutting out a square area using a cut line is displayed on the screen in a case of instructing "square printing" is illustrated. Specifically, a sample image illustrating how to cut a little inside of the cut line by scissors together with an explanatory text "Please cut a little inside of the cut line." is displayed below the "none" and "presence" buttons.

The explanatory image that explains the cut position in a case of cutting out a square area using the cut line is designed to change for each type of "square printing" such as "bordering", "borderless", "lower border", and "wide border".

Specifically, as illustrated in FIG. 11, for each type of "bordering", "borderless", "lower border", and "wide border", an explanatory image corresponding to the type of the selected "square printing" is displayed.

Figure 12:
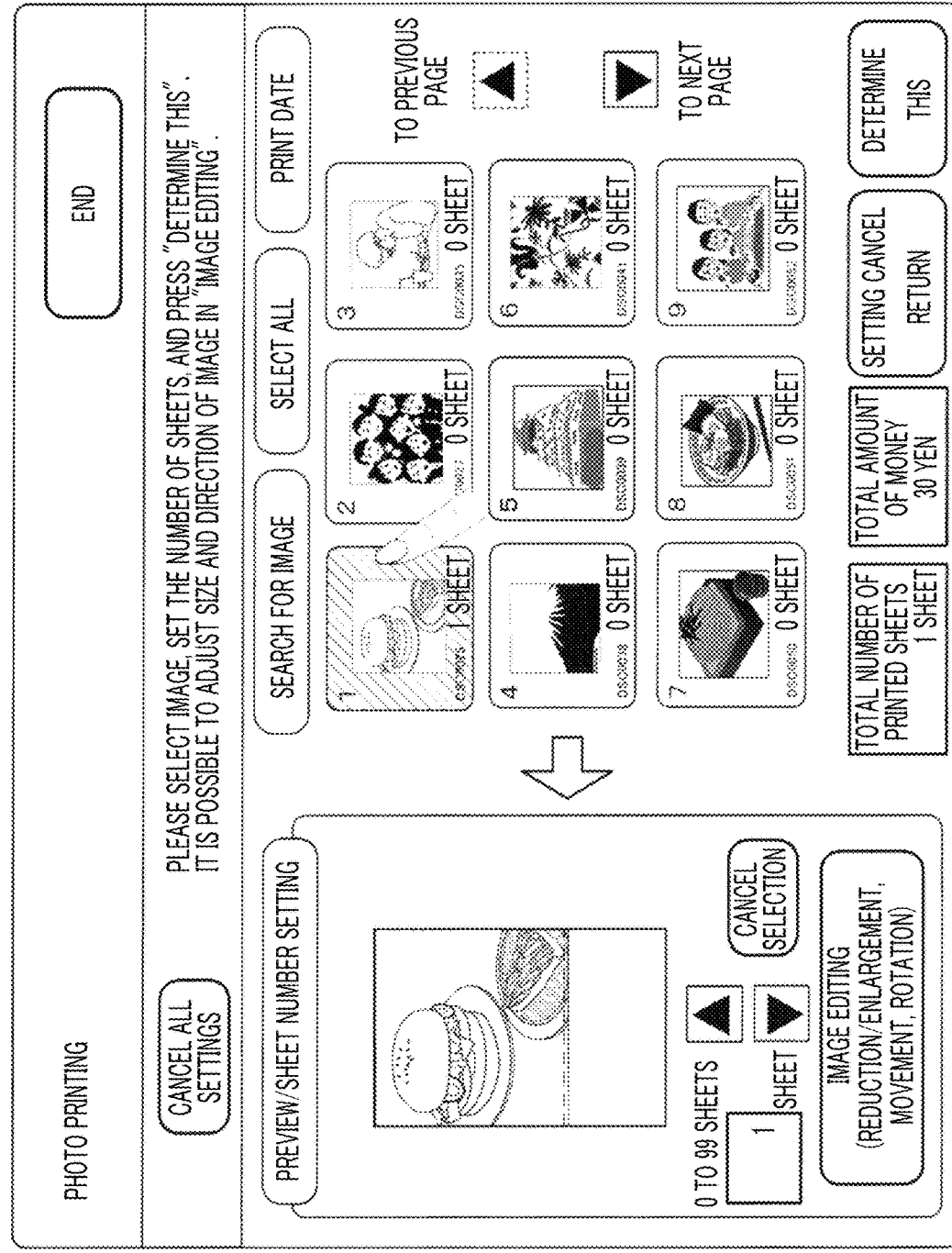
FIG. 12 is a view illustrating an example of an image selection screen displayed on a touch panel 21.

Then, after the user selects the type of "square printing" and "none" or "presence" of cut line printing by the operation as described above, the user touches the "determine this" button, whereby an image selection screen as illustrated in FIG. 12 is displayed.

On the image selection screen illustrated in FIG. 12, the user is able to select an image that the user wants photo printing and designate the number of sheets for each selected image. In addition, it is also possible to perform various image editing such as reduction/enlargement, movement, and rotation, on the selected image.

Every time an image is selected, an image in the case where the image is square printing is displayed as a preview image, and the user is able to view the image in a case where the printing process is actually performed on the recording sheet.

Figure 13:
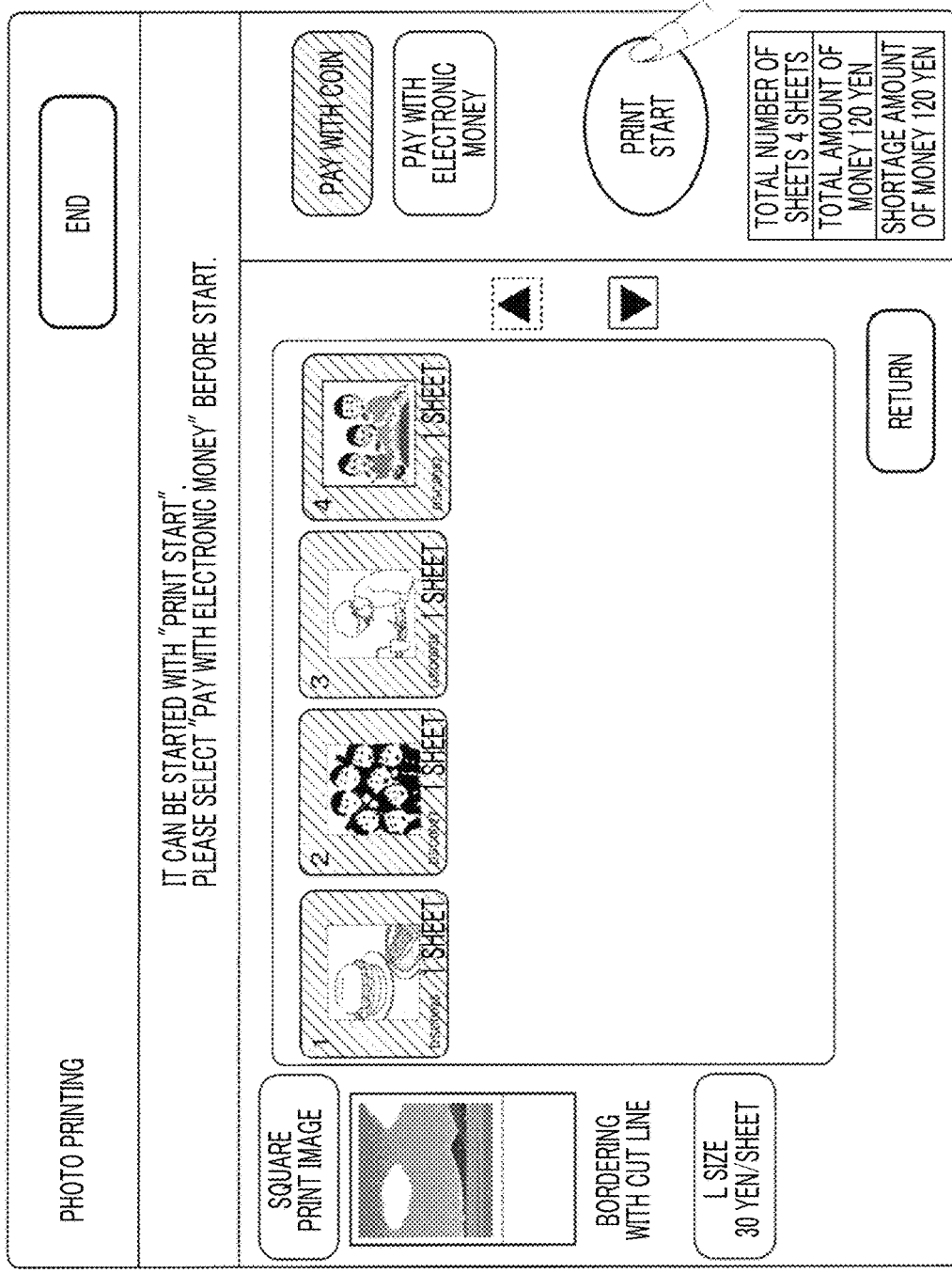
FIG. 13 is a view illustrating an example of a print start screen displayed on the touch panel 21.

Then, after the user selects all images that the user wants photo printing, by touching the "determine this" button, a print start screen as illustrated in FIG. 13 is displayed.

On the print start screen illustrated in FIG. 13, the layout image after printing is displayed together with the image selected for photo printing. Then, in a case where the user touches the "print start" button after finally checking the type of "square printing", the presence or absence of a cut line, and the number of sheets of the selected image, square printing in which the selected image is placed in a square area and printed on a recording sheet of L size is executed.

In the specific example described above, an explanatory image that explains the cut position in a case of cutting out a square area using a cut line is displayed in a case of instructing "square printing". However, the explanatory image may be printed in an area other than the square area on the recording sheet.

Figure 14:
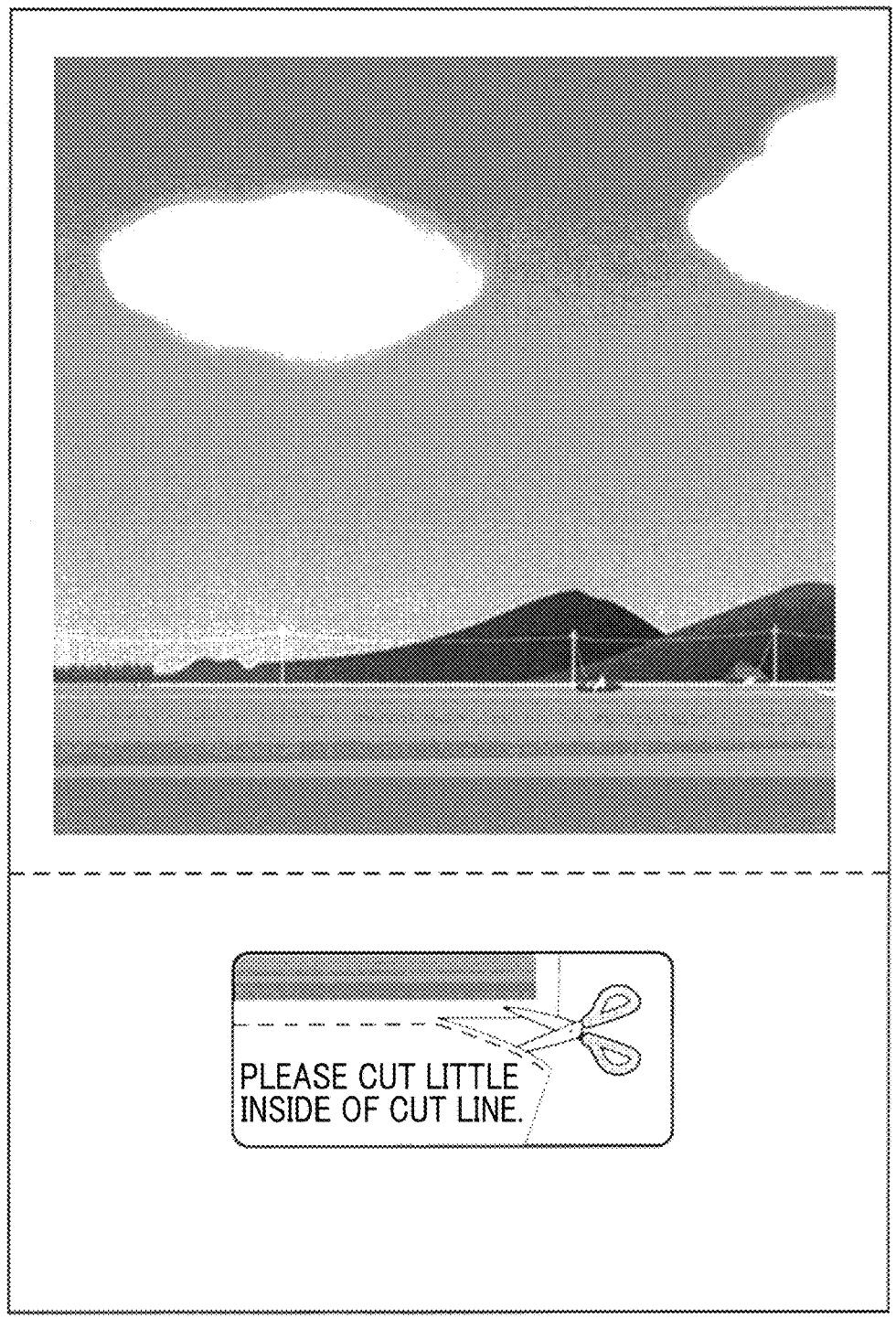
FIG. 14 is a diagram illustrating an example of a case where an explanatory image is printed on a cut-out portion, when selecting "bordering"
Figure 15:
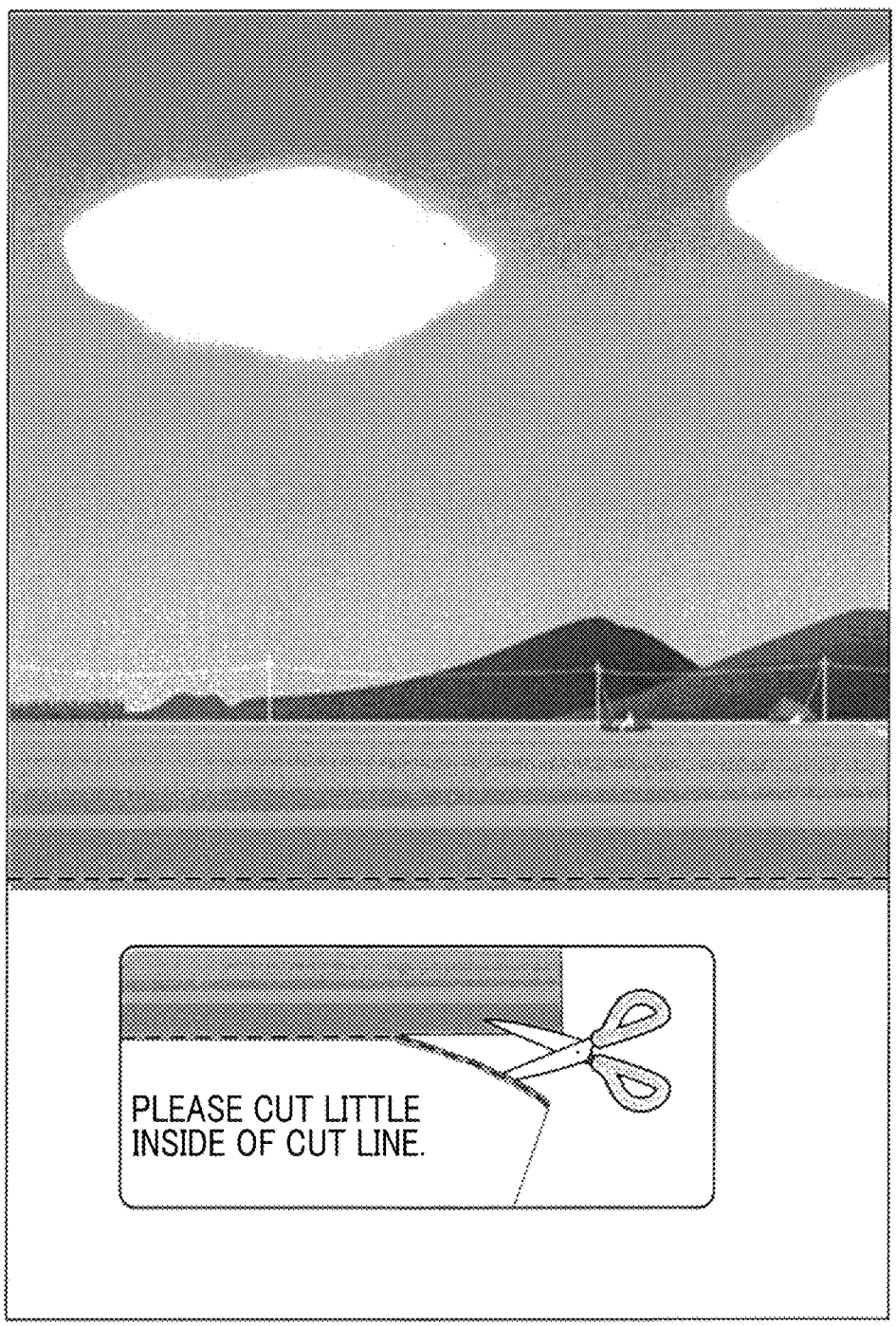
FIG. 15 is a diagram illustrating an example of a case where an explanatory image is printed on a cut-out portion, when selecting "borderless"

For example, as illustrated in FIGS. 14 and 15, in the area unnecessary in a case of cutting out the square area, an image illustrating the cut position may be printed together with a text "Please cut a little inside of the cut line."

FIG. 14 is an example in the case where "bordering" printing is selected as the type of "square printing", and FIG. 15 is an example in the case where "borderless" printing is selected as the type of "square printing". Even in each printing example, it is understood that the explanatory image corresponding to the type of the selected "square printing" is printed in the area other than the square area.

Figure 16:
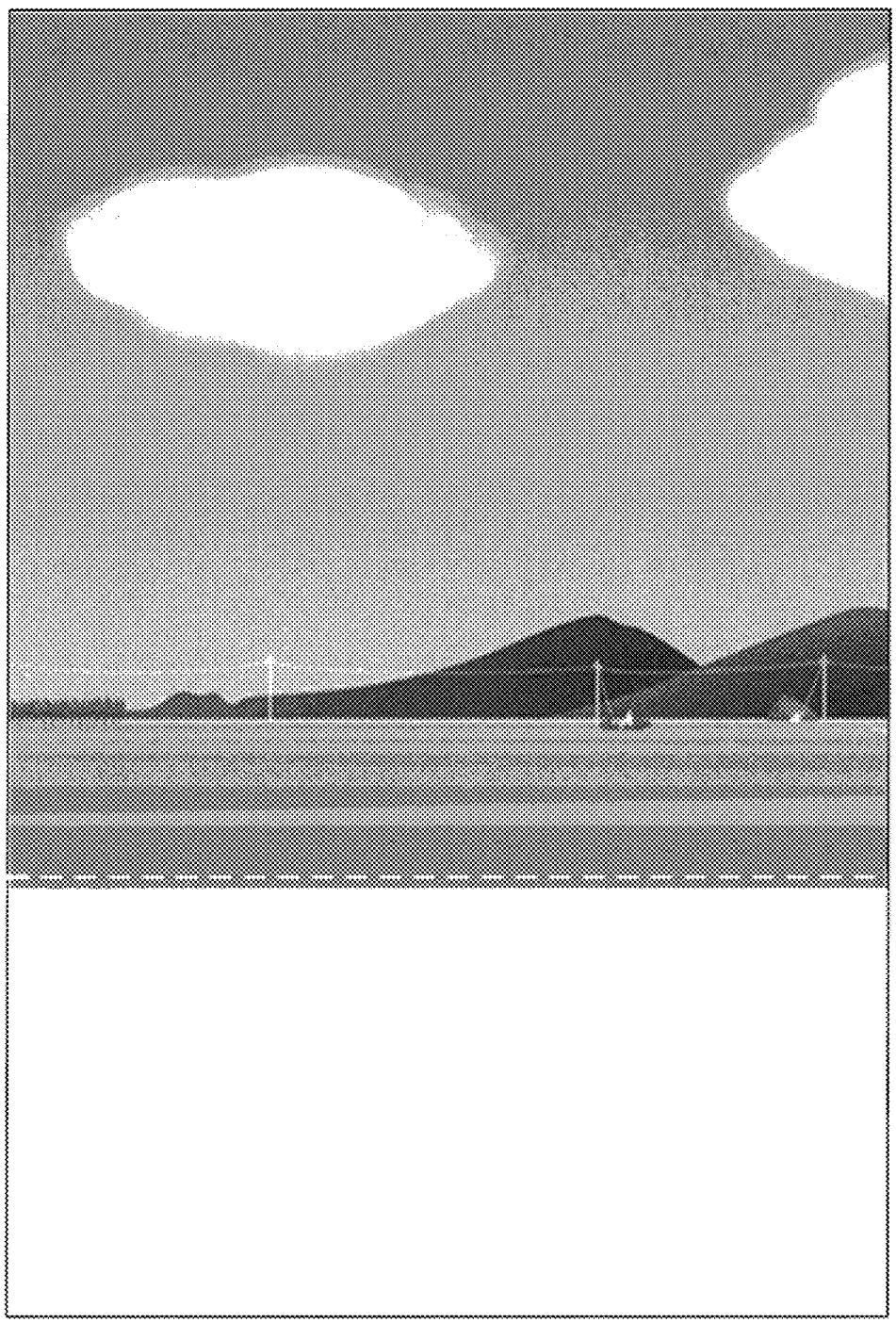
FIG. 16 is a diagram illustrating an example of printing in a case where a white cut-line image is used as a support image.

Further, in the above-described specific example, a description has been given of a case where a black cut-line image is printed as a support image that is an aid in a case where the user determines the cut position, but the support image may be a white cut-line image. FIG. 16 illustrates an example of printing in a case where a white cut-line image is used as a support image.

The white cut-line image may be formed by preventing a color material from being output in the image data of the image to be placed and printed in the square area.

Although it depends on the color of the background image, for example, even in the case where the white cut-line image remains in the square area after the cutting operation has been performed, it is less conspicuous than the black cut-line image.

In the case of using the cut-line image in the form of a broken line as such a support image, for example, by forming the cut-line image of a broken line with two colors having greatly different contrast like white and black, the user is able to easily recognize the support image even in a case where the square image is any photo image.

Further, various images other than the cut-line image may be used as the support image for supporting the specification of the cut position. FIGS. 17 and 18 are diagrams illustrating support image examples other than such a cut-line image.

For example, in (A) of FIG. 17, an example of a support image indicating a cut position by printing an image of the same color in an area to be cut out other than a square area is illustrated.

Further, in (B) of FIG. 17, an example of a support image indicating a cut position by printing a shaded image in an area to be cut out other than a square area is illustrated.

Further, in (C) of FIG. 17, an example of a case of forming a support image with two images printed near the long-side end portion of the recording sheet, for example, two short lines is illustrated.

Further, in (D) of FIG. 17, an example of a case where a support image is formed by printing a gradation image that becomes thinner towards a cut position in an area to be cut out other than a square area is illustrated.

In the examples of the support images illustrated in FIG. 17, the area to be cut out is conspicuous as compared with the cut-line image, so that the user is able to easily recognize the area to be cut.

In addition, in the above explanatory image, an explanation is made so as to cut out the inside of the cut line so that an unnecessary image is not left in the image in the square area. However, in a case where the cut line is too thin, it is sometimes difficult to recognize other than the cut line. Therefore, by making a cut line as a thick dotted line, for example, a dotted line of 1 mm width, scissors may be easily put in the cutting range of about 1 mm inside of the cut line. At this time, by cutting out it at the cut position within the cutting range of 1 mm width, the position at which the cut line is printed is adjusted such that the remaining area becomes a square.

Further, as a support image other than the cut line, it is possible to use a support image formed by using image data of an image to be placed and printed in a square area. An example of such a support image is illustrated in FIG. 18.

(A) of FIG. 18 illustrates an example of a case where a part of an image to be placed and printed in a square area is copied and used as a support image. In the case of using such a support image, since the support image is a part of the original image, for example, even in a case where the cut position is displaced and remains in the square area, it becomes less conspicuous.

However, in the example of the support image illustrated in (A) of FIG. 18, it may be difficult for the user to recognize the cut position. Therefore, as illustrated in (B) of FIG. 18, an image obtained by converting an image to be placed and printed in a square area into a monochrome image may be used. In the example of the support image illustrated in (B) of FIG. 18, since the boundary between the color image and the monochrome image is a cut position, it is possible for the user to easily recognize the cut position.

In the square printing described above, in a case where the square image is printed on the recording sheet of L size, printing layout is performed such that the three sides of the end portions of the square match the end portions of the recording sheet. That is, a printing layout is performed in which an image is printed in a square area of which one side is a short side of the recording sheet. Therefore, in a case of cutting out a square area from the printed recording sheet, it is possible to obtain a square image only by performing a necessary minimum number of cutting operations, that is, one cutting operation.

However, the present invention is not limited to this. Even in the case where an image is placed and printed in a specific area other than a square, for example, a rectangular specific area having different lengths of a long side and a short side, it is possible to similarly apply the present invention.

However, in a case where the specific area is other than a square, the necessary minimum number of times is not limited to one, but it varies depending on the shape of the recording sheet and the shape of the specific area.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
a processor configured to:
receive an instruction to place and print an image in an area of a specific shape having an aspect ratio different from an aspect ratio of a recording sheet;
perform control such that a support image is printed on the recording sheet, the support image supporting specification of a cut position to cut out the area of the specific shape, in which the image of which printing instruction that has been received is printed, from the recording sheet; and
output an explanatory image that explains the cut position with respect to the support image, in a case where the processor receives the printing instruction,
wherein the support image is formed using image data of an image obtained by converting the image to be placed and printed in the area of the specific shape into a monochrome image.

2. The image forming apparatus according to claim 1, wherein the processor outputs the explanatory image by displaying the explanatory image on a display device, in a case where the processor receives an instruction to print the image on a recording sheet by placing the image in an area of a specific shape.

3. The image forming apparatus according to claim 2, wherein the processor performs control to display a cutting method for instructing to cut out a side close to the area of the specific shape at a position where the support image is printed, as an explanatory image.

4. The image forming apparatus according to claim 1, wherein the processor outputs the explanatory image by performing a process of printing the explanatory image in an area other than the area of the specific shape on the recording sheet.

5. The image forming apparatus according to claim 1, wherein the support image is a cut-line image.

6. The image forming apparatus according to claim 2, wherein the support image is a cut-line image.

7. The image forming apparatus according to claim 3, wherein the support image is a cut-line image.

8. The image forming apparatus according to claim 5, wherein in a case where edgeless printing is designated, the cut-line image is printed across the image of the specific shape.

9. The image forming apparatus according to claim 8, wherein the cut-line image is formed by preventing a color material from being output in image data of the image to be placed and printed in the area of the specific shape.

10. The image forming apparatus according to claim 5, wherein the cut-line image is formed using at least two colors having different contrasts.

11. The image forming apparatus according to claim 10, wherein the cut-line image is a broken line.

12. The image forming apparatus according to claim 1, wherein the support image is configured with two images printed in the vicinity of a long-side end portion of the recording sheet.

13. The image forming apparatus according to claim 1, wherein the support image is configured with images of the same color.

14. The image forming apparatus according to claim 1, wherein three sides of the end portions of the specific shape are aligned with end portions of the recording sheet.

15. The image forming apparatus according to claim 14, wherein the specific shape is a square of which one side is a short side of the recording sheet.

16. The image forming apparatus according to claim wherein the cut position is between the area of the specific shape on the recording sheet and the support image.

17. The image forming apparatus according to claim 16, wherein the support image is provided at a position separated from the cut position by substantially the same length as a width of the support image.

18. A non-transitory computer readable medium storing a program causing a computer to execute:
   receiving an instruction to place and print an image in an area of a specific shape having an aspect ratio different from an aspect ratio of a recording sheet;
   performing control such that a support image is printed on the recording sheet, the support image supporting specification of a cut position to cut out the area of the specific shape, in which the image of which printing instruction is received in the receiving is printed, from the recording sheet; and
   outputting an explanatory image that explains the cut position with respect to the support image, in a case where the printing instruction is received in the receiving,
   wherein the support image is formed using image data of an image obtained by converting the image to be placed and printed in the area of the specific shape into a monochrome image.

19. A non-transitory computer readable medium storing a program causing a computer to execute:
   a reception step that receives an instruction to fit an image in a square area and to print the fitted image on a recording sheet;
   a print control step that performs control such that a support image is printed on the recording sheet, the support image supporting specification of a cut position to cut out the square area, in which the image of which the instruction is received in the reception step is printed, from e recording sheet; and
   an output step that that outputs an explanatory image that explains the cut position with respect to the support image, in a case where the printing instruction is received in the reception step,
   wherein the support image is provided at a position separated from the cut position by substantially the same length as a width of the support image,
   wherein the instruction to print the fitted image has a plurality of instructions selected by a user, and the explanatory image is designed to be changed based on a selection of the user.

20. The non-transitory computer readable medium storing a program causing a computer to execute steps according to claim 19,
   wherein the plurality of instructions is performed to arrange the image in an area slightly larger than the square area and to arrange the image in the square area without margin.

\* \* \* \* \*